United States Patent
Iijima et al.

(10) Patent No.: US 9,429,936 B2
(45) Date of Patent: Aug. 30, 2016

(54) SERVO MOTOR CONTROLLER HAVING SELF-MEASURING FUNCTION AND SELF-MONITORING FUNCTION OF MECHANICAL STIFFNESS

(71) Applicant: FANUC CORPORATION, Yamanashi (JP)

(72) Inventors: Kazunori Iijima, Yamanashi (JP); Satoshi Ikai, Yamanashi (JP)

(73) Assignee: Fanuc Corporation, Yamanashi (JP)

(\*) Notice: Subject to any disclaimer, the term of this patent is extended or adjusted under 35 U.S.C. 154(b) by 0 days.

(21) Appl. No.: 14/807,967

(22) Filed: Jul. 24, 2015

(65) Prior Publication Data
US 2016/0033959 A1 Feb. 4, 2016

(30) Foreign Application Priority Data
Jul. 31, 2014 (JP) ................................ 2014-157147

(51) Int. Cl.
G05B 11/32 (2006.01)
G05B 19/416 (2006.01)

(52) U.S. Cl.
CPC . G05B 19/4163 (2013.01); *G05B 2219/41057* (2013.01)

(58) Field of Classification Search
CPC .. G05B 19/19; G05B 19/39; G05B 19/4141; G05D 3/1418
USPC ........................................ 318/625, 629, 632
See application file for complete search history.

(56) References Cited

U.S. PATENT DOCUMENTS

| 5,646,495 A * | 7/1997 | Toyozawa ............... G05B 19/19 318/6 |
| 6,590,358 B1 * | 7/2003 | Tsutsui ..................... G05B 5/01 318/560 |
| 6,900,609 B2 * | 5/2005 | Kunzel ............... H02P 29/0016 318/609 |
| 7,656,106 B2 * | 2/2010 | Iwashita ............... G05B 19/195 318/39 |
| 2003/0030401 A1 * | 2/2003 | Fujishima ............ G05B 19/404 318/632 |
| 2008/0180052 A1 * | 7/2008 | Iwashita ................ G05B 19/19 318/615 |

FOREIGN PATENT DOCUMENTS

JP      2012023834 A      2/2012

OTHER PUBLICATIONS

English Abstract and machine translation for Japanese Publication No. 2012-023834, published Feb. 2, 2012, 29 pgs.

\* cited by examiner

*Primary Examiner* — Rina Duda
(74) *Attorney, Agent, or Firm* — Fredrikson & Byron, P.A.

(57) ABSTRACT

A servo motor controller includes a speed command generating unit for generating a speed command value of the servo motor, a speed detecting unit that detects a speed of the servo motor, a torque command generating unit for generating a torque command value, a sine wave generating unit for generating a sinusoidal disturbance value, a frequency response calculating unit for calculating a frequency response when the sinusoidal disturbance value has been input to a speed control loop, a resonance frequency detecting unit for detecting a resonance frequency at which a gain is maximized, a resonance frequency storing unit for storing the resonance frequency, at least one filter for attenuating a specific frequency band component included in the torque command value, and a resonance frequency comparing unit for measuring stiffness of a machine tool based on the resonance frequency and adjusts the filter with respect to the resonance frequency.

4 Claims, 8 Drawing Sheets

SERVO MOTOR CONTROLLER HAVING SELF-MEASURING FUNCTION AND SELF-MONITORING FUNCTION OF MECHANICAL STIFFNESS

CROSS-REFERENCE TO RELATED APPLICATION

This application is a new U.S. patent application that claims benefit of Japanese Patent Application No. JP 2014-157147, filed on Jul. 31, 2014, the entire content of JP 2014-157147 is hereby incorporated by reference.

FIELD OF THE INVENTION

The present invention relates to a servo motor controller. In particular, the present invention relates to a servo motor controller having self-measuring and self-monitoring functions for mechanical stiffness.

BACKGROUND OF THE INVENTION

A technology, in which a band elimination filter is applied to a torque command value for the stabilization of a servo control system of a machine tool, has been widely used. In a general filter adjustment procedure, sine wave sweeping or square wave sweeping is performed for a speed control loop including a torque command generating unit and a speed detecting unit, so that a frequency response of the speed control loop is measured. Next, a graph visualized as a Bode diagram is closely examined, so that a resonance frequency can be seen with one's eyes. Even though the Bode diagram is not visualized, since the specification of the resonance frequency is possible, a technology for performing automatic adjustment of the band elimination filter has been designed.

Since the characteristics of the automatic adjustment do not depend on the adjustment policy or capacity of an engineer who performs manual adjustment, an adjustment result with a relatively small variation is obtained. By the automatic filter adjustment function, the stiffness of a machine tool is measured with a variation smaller than that of manual measurement.

As a method for performing the adjustment of a band elimination filter, there has been reported a method for detecting a frequency with a vibration level exceeding a threshold value in order to suppress mechanical resonance, thereby automatically performing the adjustment of a plurality of band elimination filters (for example, JP 2012-23834 A). In this related art, when two band elimination filters have center frequencies adjacent to each other, a filter width of a first filter is widened.

The aforementioned related art discloses an automatic adjustment algorithm of a plurality of band elimination filters. However, the subject of the related art is merely for performing adjustment for simply solving resonance. Actually, the related art substitutes for the adjustment of a servo control system just before machine shipment. The related art does not disclose how to cope with a secular change and an individual difference of the stiffness of a machine tool as a long-term facility or a mass-produced industrial product.

SUMMARY OF THE INVENTION

Therefore, it is an object of the present invention to provide a servo motor controller capable of providing a comprehensive inspection technology, which enables maintenance inspection prediction of a machine in non-destructive and non-disassembly as well as simple stabilization of a servo control system.

A servo motor controller according to an embodiment of the present invention is a controller that controls a servo motor for driving a machine tool and includes: a speed command generating unit for generating a speed command value of the servo motor; a speed detecting unit for detecting a speed of the servo motor; a torque command generating unit for generating a torque command value of the servo motor on a basis of the speed command value and the detected speed; a sine wave generating unit for generating a sinusoidal disturbance value; a frequency response calculating unit for adding the sinusoidal disturbance value generated by the sine wave generating unit to the speed command value, thereby calculating a frequency response on a basis of output from a speed control loop when the sinusoidal disturbance value has been input to the speed control loop including the torque command generating unit and the speed detecting unit; a resonance frequency detecting unit for detecting a resonance frequency which is a frequency at which a gain of the calculated frequency response is maximized; a resonance frequency storing unit for storing the resonance frequency detected by the resonance frequency detecting unit; at least one filter for attenuating a specific frequency band component included in the torque command value; and a resonance frequency comparing unit for measuring stiffness of a machine tool on a basis of the resonance frequency stored in the resonance frequency storing unit, and adjusts the filter with respect to the resonance frequency.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Hereinafter, with reference to the drawings, a servo motor controller according to the present invention will be described. It should be noted that the technical scope of the present invention is not limited to the following embodiments, and extends to the invention defined in the appended claims and equivalents thereof.

First Embodiment

Figure 1:
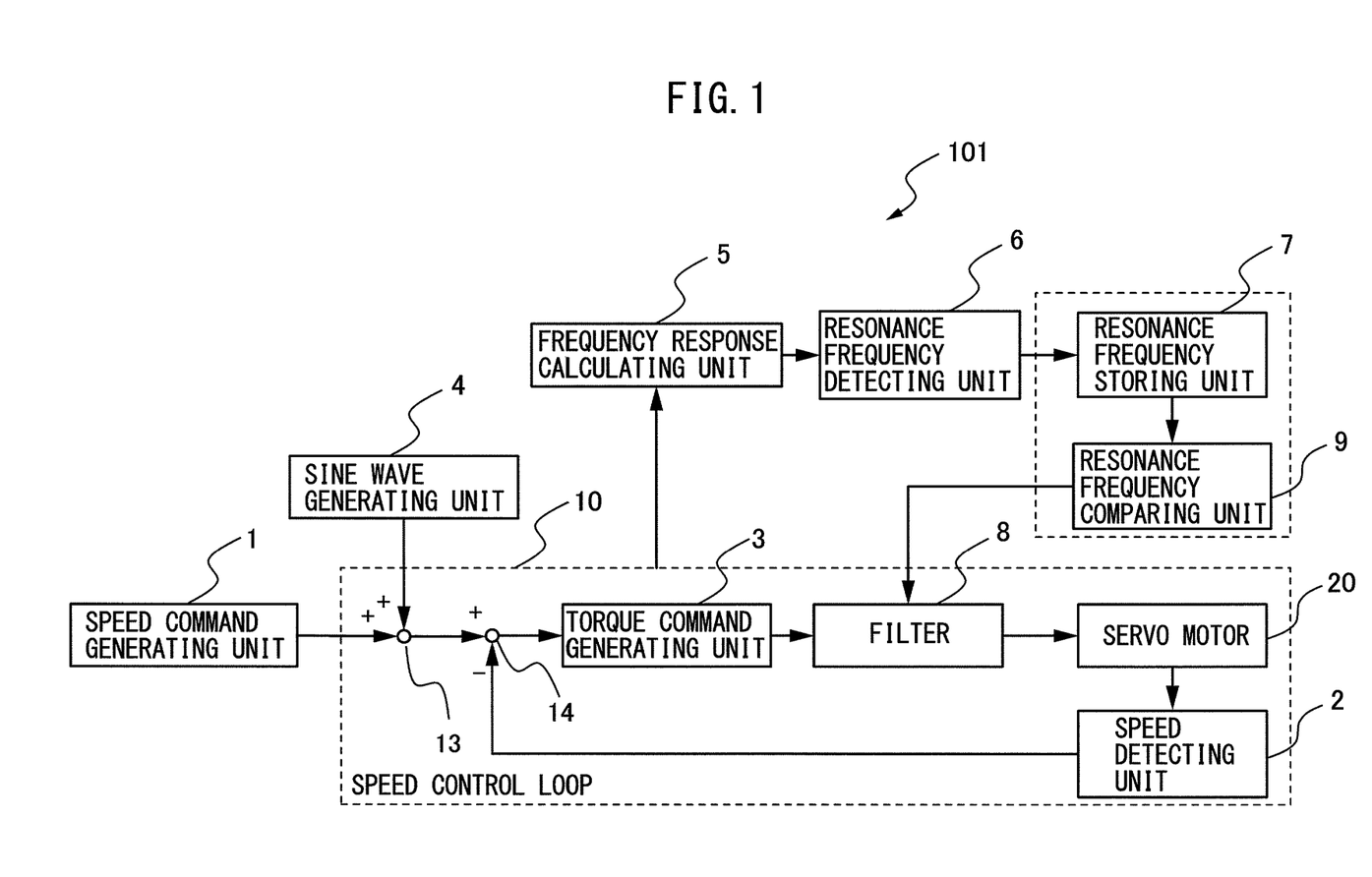
FIG. 1 is a configuration diagram of a servo motor controller according to the first embodiment of the present invention.

A servo motor controller according to the first embodiment of the present invention will be described with reference to the drawings. FIG. 1 is a configuration diagram of a servo motor controller according to the first embodiment of the present invention. A servo motor controller 101 according to the first embodiment of the present invention includes a speed command generating unit 1, a speed detecting unit 2, a torque command generating unit 3, a sine wave generating unit 4, a frequency response calculating unit 5, a resonance frequency detecting unit 6, a resonance frequency storing unit 7, a filter 8, and a resonance frequency comparing unit 9.

The speed command generating unit 1 generates a speed command value for driving a servo motor 20. The speed command value generated by the speed command generating unit 1 is output to an adder 13. In the adder 13, the speed command value is added to a sinusoidal disturbance value generated by the sine wave generating unit 4, and a resultant value is output to a subtracter 14.

The speed detecting unit 2 detects the speed of the servo motor 20. The speed of the servo motor 20, for example, can be detected by an encoder provided in the servo motor 20; however, the present invention is not limited thereto. In the subtracter 14, a value of the speed of the servo motor 20 detected by the speed detecting unit 2 is subtracted from the speed command value to which the sinusoidal disturbance value has been added, and a resultant value is output to the torque command generating unit 3.

The torque command generating unit 3 generates a torque command value of the servo motor on the basis of the speed command value and the detected speed. As described above, the sinusoidal disturbance value generated by the sine wave generating unit 4 has been added to the speed command value. The torque command value generated by the torque command generating unit 3 is output to the filter 8 and the frequency response calculating unit 5.

The frequency response calculating unit 5 adds the sinusoidal disturbance value generated by the sine wave generating unit 4 to the speed command value, thereby calculating a frequency response on the basis of output from a speed control loop 10 when the sinusoidal disturbance value has been input to the speed control loop 10 including the torque command generating unit 3 and the speed detecting unit 2. The frequency response calculated by the frequency response calculating unit 5 is output to the resonance frequency detecting unit 6.

The resonance frequency detecting unit 6 detects a resonance frequency which is a frequency at which a gain of the calculated frequency response is maximized, and outputs the resonance frequency to the resonance frequency storing unit 7.

The frequency storing unit 7 stores the resonance frequency detected by the resonance frequency detecting unit 6. When the measurement of the resonance frequency has been performed a plurality of times, the resonance frequency storing unit 7 stores the resonance frequency of each time and preserves a history of the resonance frequencies. Furthermore, the resonance frequency storing unit 7 can also store a reference resonance frequency serving as a reference to be compared with the detected resonance frequency. Moreover, when the resonance frequency is measured at a predetermined time, the resonance frequency storing unit 7 can also store data regarding time in correlation with data regarding the detected resonance frequency.

The filter 8 attenuates a specific frequency band component included in the torque command value output from the torque command generating unit 3. FIG. 1 illustrates an example in which one filter 8 is provided; however, the present invention is not limited thereto. Two or more filters 8 may also be provided.

The resonance frequency comparing unit 9 measures the stiffness of a machine tool on the basis of the resonance frequency stored in the resonance frequency storing unit 7, and adjusts the filter 8 with respect to the resonance frequency.

As described above, the servo motor controller according to the first embodiment of the present invention is characterized in that the stiffness of a machine tool is measured on the basis of the resonance frequency. Hereinafter, a method for measuring the stiffness of a machine tool on the basis of the resonance frequency will be described.

Figure 2:
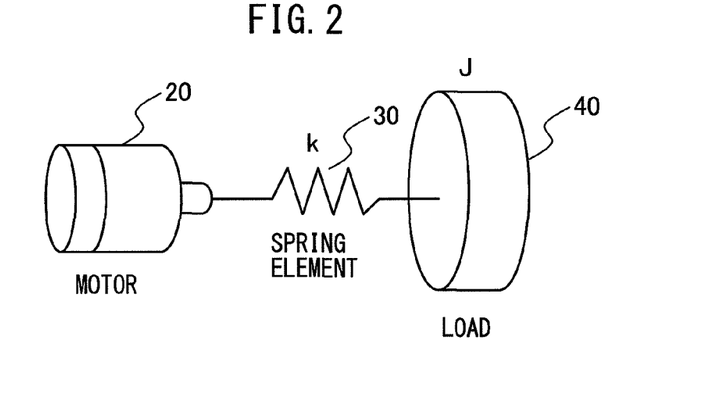
FIG. 2 is a diagram illustrating a model obtained by simplifying a machine.

The machine tool is simplified and treated as a model illustrated in FIG. 2. In other words, the machine tool is regarded as an aggregation of a plurality of spring elements 30 and a load 40. In this way, the mechanical stiffness can be treated as a spring element k. Then, a resonance angular frequency (a resonance frequency) $\omega_n$ of the machine is expressed by the following Equation 1.

$$\omega_n = \sqrt{\frac{k}{J}} \quad (1)$$

In Equation 1 above, J denotes the inertia of the load.

Since the inertia of the load J is decided in machine design, it is possible to estimate the spring element from the measurement of the frequency response. When the resonance angular frequency changes from a reference value $\omega_{n0}$ to $\omega_n$, and the spring element changes from $k_0$ to k', a ratio $k'/k_0$ can be calculated from the following Equation 2.

$$\frac{k'}{k_0} = \left(\frac{\omega_n'}{\omega_{n0}}\right)^2 \quad (2)$$

The value of the reference value $\omega_{n0}$ may also be a value on machine design, or may also be a resonance angular frequency of a test model in the case of a mass production model. In the case of a specific individual, a history may also be preserved as a resonance angular frequency at the time of manufacturing. Since the stiffness of the spring element is considered to be reduced by assembly loosening and the like of mechanical parts, even though the stiffness is reduced due to aging, it should be assumed that the stiffness is not improved.

For example, when the resonance angular frequency is reduced by 10% (reaches 90% of the reference), $k'/k_0$ is calculated by the following Equation 3.

$$\frac{k'}{k_0} = (1 - 0.1)^2 = 0.9^2 = 0.81 \quad (3)$$

By Equation 3 above, it can be understood that the mechanical stiffness has been reduced by 19%.

As described above, in accordance with the servo motor controller according to the first embodiment of the present invention, it is possible to measure the mechanical stiffness from the detected resonance frequency.

Figure 3:
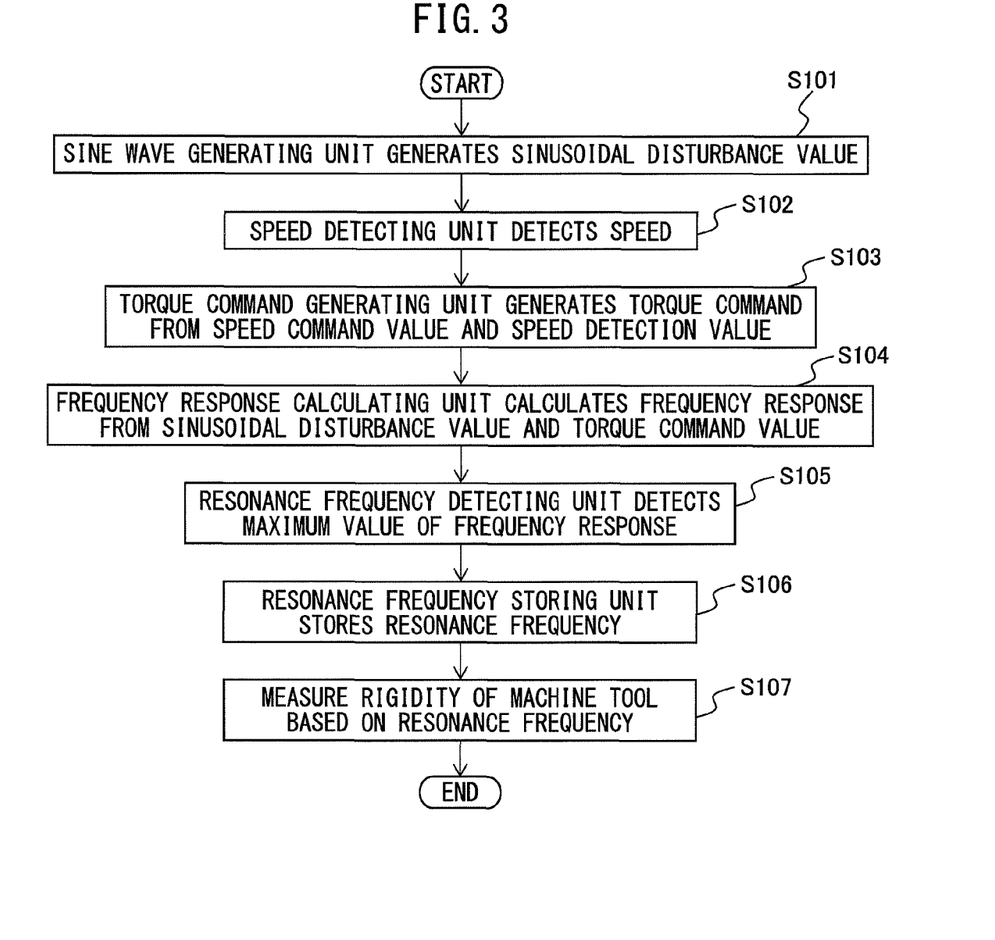
FIG. 3 is a flowchart for explaining an operation procedure of a servo motor controller according to the first embodiment of the present invention.

Next, an operation procedure of the servo motor controller according to the first embodiment of the present invention will be described with reference to the flowchart illustrated in FIG. 3. Firstly, in step S101, the sine wave generating unit 4 generates a sinusoidal disturbance value. The generated sinusoidal disturbance value is input to the adder 13 included in the speed control loop 10, and is added to a speed command value.

Next, in step S102, the speed detecting unit 2 detects the speed of the servo motor 20. A speed detection value, which is a value of the detected speed, is input to the subtracter 14.

Next, in step S103, the torque command generating unit 3 generates a torque command from the speed command value and the speed detection value. The generated torque command is output to the filter 8 and the frequency response calculating unit 5.

Next, in step S104, the frequency response calculating unit 5 calculates a frequency response from the sinusoidal disturbance value and output from the speed control loop 10, for example, the torque command value. The calculated frequency response is output to the resonance frequency detecting unit 6.

Next, in step S105, the resonance frequency detecting unit 6 detects a maximum value of the frequency response. The detected maximum value of the frequency response is output to the resonance frequency storing unit 7.

Then, in step S106, the resonance frequency storing unit 7 stores a resonance frequency.

Last, in step S107, the resonance frequency comparing unit 9 takes out the resonance frequency from the resonance frequency storing unit 7, and measures the stiffness of a machine tool on the basis of the resonance frequency. Moreover, the resonance frequency comparing unit 9 adjusts the filter 8 with respect to the resonance frequency.

As described above, in accordance with the servo motor controller according to the first embodiment of the present invention, based on a structure of automatically adjusting a band attenuation filter on the basis of the measurement of the resonance frequency, the resonance frequency is regarded as a physical quantity indicating the stiffness of a machine. In this way, it is possible to dynamically measure the stiffness of a mechanical system driven with a servo motor without disassembling the machine.

Second Embodiment

Next, a servo motor controller according to a second embodiment of the present invention will be described. The servo motor controller according to the second embodiment has a configuration similar to that of the servo motor controller according to the first embodiment illustrated in FIG. 1. The servo motor controller according to the second embodiment is different from the servo motor controller according to the first embodiment in that the resonance frequency comparing unit 9 compares the resonance frequency stored in the resonance frequency storing unit 7 with a reference resonance frequency, thereby detecting a change in the stiffness of a machine. Since other configurations of the servo motor controller according to the second embodiment are similar to those of the servo motor controller according to the first embodiment, a detailed description thereof will be omitted.

Figure 4:
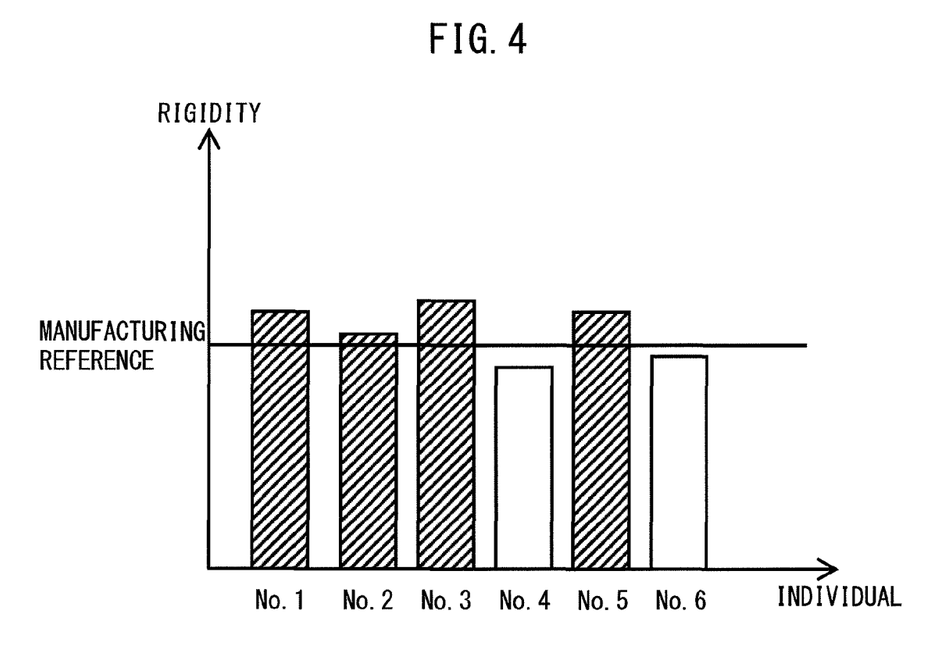
FIG. 4 is a graph illustrating an example in which stiffness values of a plurality of machines are compared with a manufacturing reference value.

By using the servo motor controller according to the second embodiment of the present invention, respective individual differences of stiffness of mass production machines are measured and compared with one other, so that it is possible to evaluate a dynamic variation of the stiffness of mechanism units. FIG. 4 illustrates an example of a graph in which stiffness values of a plurality of machines, for example, machines with machine numbers 1 to 6, have been compared with a manufacturing reference value. FIG. 4 illustrates that the mechanical stiffnesses of the machines with the machine numbers 1 to 3 and 5 hatched by solid lines satisfy the manufacturing reference, but the mechanical stiffnesses of the non-hatched machines with the machine numbers 4 and 6 do not satisfy the manufacturing reference. In the example illustrated in FIG. 4, it is possible to easily confirm that inspection is needed without disassembling the machines because the machines with the machine numbers 4 and 6 do not satisfy the manufacturing reference value. When the servo motor controller according to the second embodiment of the present invention is used, it is possible to improve quality management and manufacturing know-how for a machine tool as a finished product other than individual mechanical parts.

Figure 5:
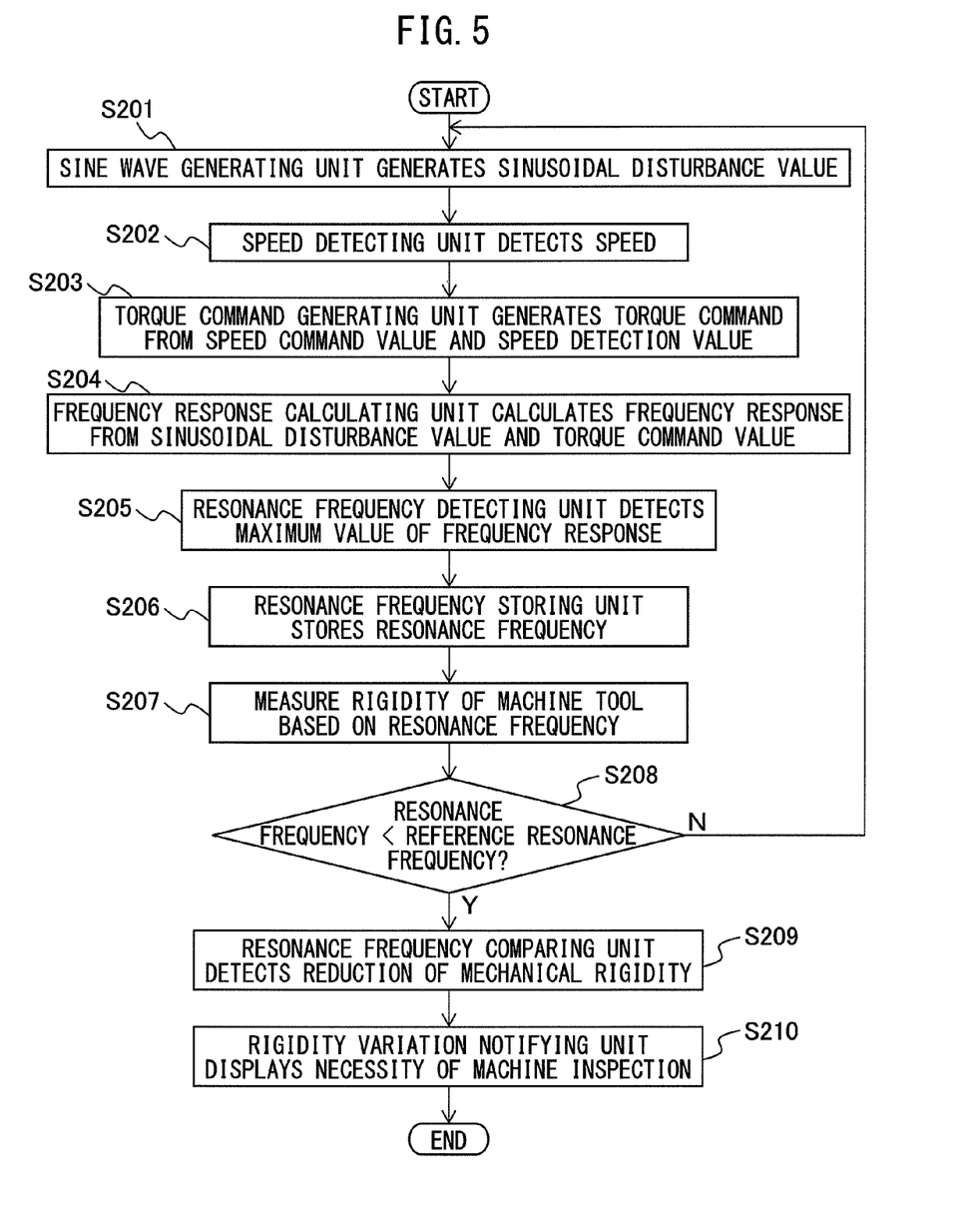
FIG. 5 is a flowchart for explaining an operation procedure of a servo motor controller according to the second embodiment of the present invention.

Next, an operation procedure of the servo motor controller according to the second embodiment of the present invention will be described with reference to the flowchart illustrated in FIG. 5. Since steps S201 to S207 in the flowchart illustrated in FIG. 5 are similar to steps S101 to S107 in the flowchart for the servo motor controller according to the first embodiment illustrated in FIG. 3, a detailed description thereof will be omitted.

In step S208, the resonance frequency comparing unit 9 determines whether the resonance frequency stored in the resonance frequency storing unit 7 is smaller than a reference resonance frequency. When the resonance frequency comparing unit 9 determines that the resonance frequency is equal to or more than the reference resonance frequency, the procedure returns to step S201 and the detection of the resonance frequency is performed again. In addition, as a result of measuring the resonance frequency of a specific machine over a predetermined period of time, when it is possible to confirm that the measured resonance frequency is not smaller than the reference resonance frequency, the resonance frequencies of other machines may be measured to detect the presence or absence of the reduction of mechanical stiffness.

On the other hand, when the resonance frequency comparing unit 9 determines that the resonance frequency is smaller than the reference resonance frequency, the resonance frequency comparing unit 9 detects the reduction of the mechanical stiffness in step S209.

Lastly, in step S210, when a stiffness variation notifying unit to be described layer has been provided, the stiffness variation notifying unit displays the necessity of machine inspection.

As described above, in accordance with the servo motor controller according to the second embodiment of the present invention, the reference value of the resonance frequency is compared with an actually measured value, so that it is possible to measure a variation from the reference value and to perform inspection of a component assembly. For example, in the case of producing 10 same machine tools, a measurement result of a machine with the machine number 1 is employed as a reference value, so that it is possible to grasp and manage a stiffness variation in a manufacturing process with respect to the other nine machines, and thus to achieve quality improvement.

Third Embodiment

Next, a servo motor controller according to an third embodiment of the present invention will be described. The servo motor controller according to the third embodiment has a configuration similar to that of the servo motor controller according to the first embodiment illustrated in FIG. 1. The servo motor controller according to the third embodiment is different from the servo motor controller according to the first embodiment in that the resonance frequency storing unit 7 preserves a history of resonance frequencies in each measurement, and the resonance frequency comparing unit 9 compares the resonance frequency stored in the resonance frequency storing unit 7 with the history of the resonance frequencies to thereby detect a reduction tendency of the stiffness of a machine. Since other configurations of the servo motor controller according to the third embodiment are similar to those of the servo motor controller according to the first embodiment, a detailed description thereof will be omitted.

Figure 6:
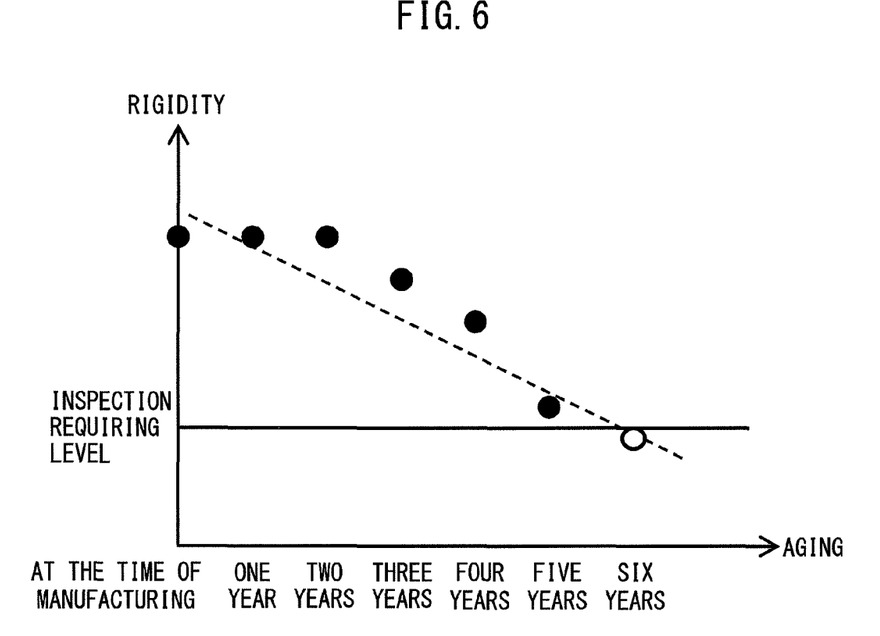
FIG. 6 is a graph illustrating an example of a time-dependent change of the stiffness of a machine.

In accordance with the servo motor controller according to the third embodiment, stiffness at the time of manufacturing is set as a reference and a secular change in the stiffness of a machine is monitored, so that it is possible to predict an inspection time of the machine. FIG. 6 exemplifies a graph indicating a secular change in the stiffness of a machine. In FIG. 6, black circles indicate that machine stiffness exceeds an inspection requiring level, i.e. the machine stiffness is sufficient. On the other hand, a while circle indicates that the machine stiffness is equal to or less than the inspection requiring level, i.e. the machine stiffness is not sufficient. In the example illustrated in FIG. 6, it can be understood that no stiffness reduction occurs within two years after the manufacturing, but the machine stiffness shows a reduction tendency after three years. After five years, the stiffness reduction occurs around the inspection requiring level. Typically, the inspection of a machine tool as a production facility is not performed only in a scheduled time. In accordance with the servo motor controller according to the present embodiment, a reduction tendency curve (or a straight line) is used, so that it is possible to predict that inspection is needed after six years after the manufacturing. Particularly, it possible to predict an inspection time at the time point at which four years have passed without waiting for the measurement of stiffness after five years. Preferably, mechanical stiffness at the measurement time point may be guaranteed. As described above, in accordance with the servo motor controller according to the third embodiment of the present invention, it is possible to measure a machine in a perfect state and to predict an inspection time without disassembling individual mechanical parts.

Next, an estimation method of an inspection time will be described in detail. For example, when mechanical stiffness has become less than a reference value by 8% (0.92 times of a reference) due to a secular change, "inspection time notification" is considered to be performed. In this case, a resonance angular frequency $\omega_n'$ employed as a reference for notifying an inspection time can be calculated back by using the following Equation 4.

$$\frac{\omega_n'}{\omega_{n0}} = \sqrt{\frac{k'}{k_0}} = \sqrt{0.92} = 0.96 \qquad (4)$$

Accordingly, it can be understood that it is sufficient if the inspection time notification is performed when the resonance angular frequency has been reduced by 4%.

Figure 7:
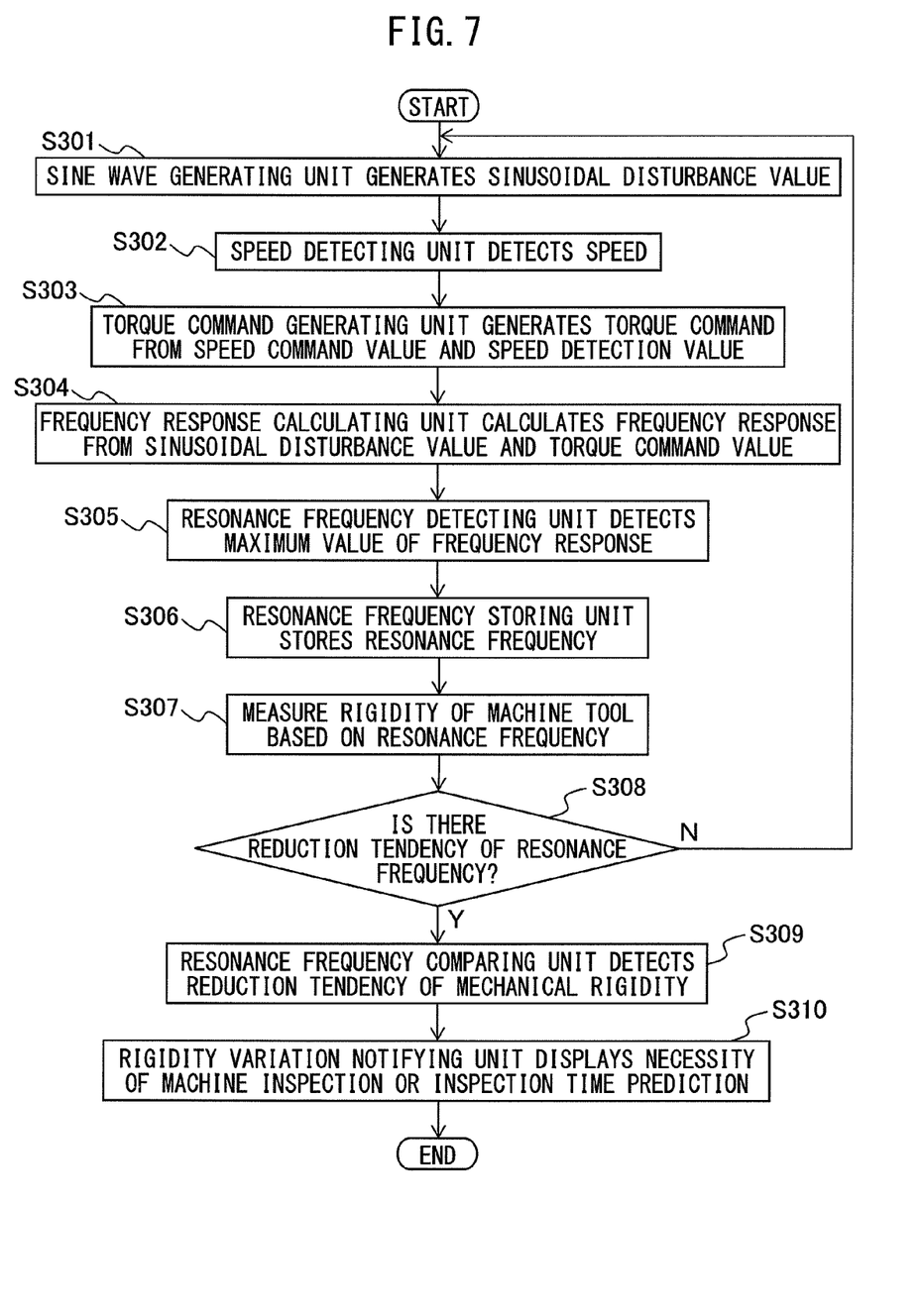
FIG. 7 is a flowchart for explaining an operation procedure of a servo motor controller according to the third embodiment of the present invention.

Next, an operation procedure of the servo motor controller according to the third embodiment of the present invention will be described with reference to the flowchart illustrated in FIG. 7. Since steps S301 to S307 in the flowchart illustrated in FIG. 7 are similar to steps S101 to S107 in the flowchart for the servo motor controller according to the first embodiment illustrated in FIG. 3, a detailed description thereof will be omitted.

In step S308, the resonance frequency comparing unit 9 determines whether there is a reduction tendency of the resonance frequency stored in the resonance frequency storing unit 7. When the resonance frequency comparing unit 9 determines that there is no reduction tendency of the resonance frequency, the procedure returns to step S301 and the detection of the resonance frequency is performed again after a predetermined period of time passes. Then, a history of resonance frequencies in each measurement is preserved.

On the other hand, when the resonance frequency comparing unit 9 determines that there is the reduction tendency of the resonance frequency, the resonance frequency comparing unit 9 detects a reduction tendency of mechanical stiffness in step S309.

Next, in step S310, when a stiffness variation notifying unit to be described later has been provided, the stiffness variation notifying unit displays the necessity of machine inspection, or inspection time prediction.

As described above, in accordance with the servo motor controller according to the third embodiment of the present invention, a history of resonance frequencies in each measurement is preserved and a variation tendency of the resonance frequencies is monitored from the history. For example, when it is considered that automatic filter adjustment is periodically performed for one machine tool, it is possible to trace the time and the degree (Hz) for/by which mechanical resonance has been varied from the history of the resonance frequencies. In other words, it is possible to examine a tendency of stiffness reduction (to examine a speed at which the mechanical stiffness is degraded due to aging).

Fourth Embodiment

Next, a servo motor controller according to an fourth embodiment of the present invention will be described. The servo motor controller according to the fourth embodiment has a configuration similar to that of the servo motor controller according to the first embodiment illustrated in FIG. 1. The servo motor controller according to the fourth embodiment is different from the servo motor controller according to the first embodiment in that the resonance frequency comparing unit 9 compares the resonance frequency stored in the resonance frequency storing unit 7 with a reference resonance frequency to thereby detect a change in the stiffness of a machine, the resonance frequency storing unit 7 preserves a history of resonance frequencies in each measurement, and the resonance frequency comparing unit 9 compares the resonance frequency stored in the resonance frequency storing unit 7 with the history of the resonance frequencies to thereby detect a reduction tendency of the stiffness of a machine. Since other configurations of the servo motor controller according to the fourth embodiment are similar to those of the servo motor controller according to the first embodiment, a detailed description thereof will be omitted.

Figure 8:
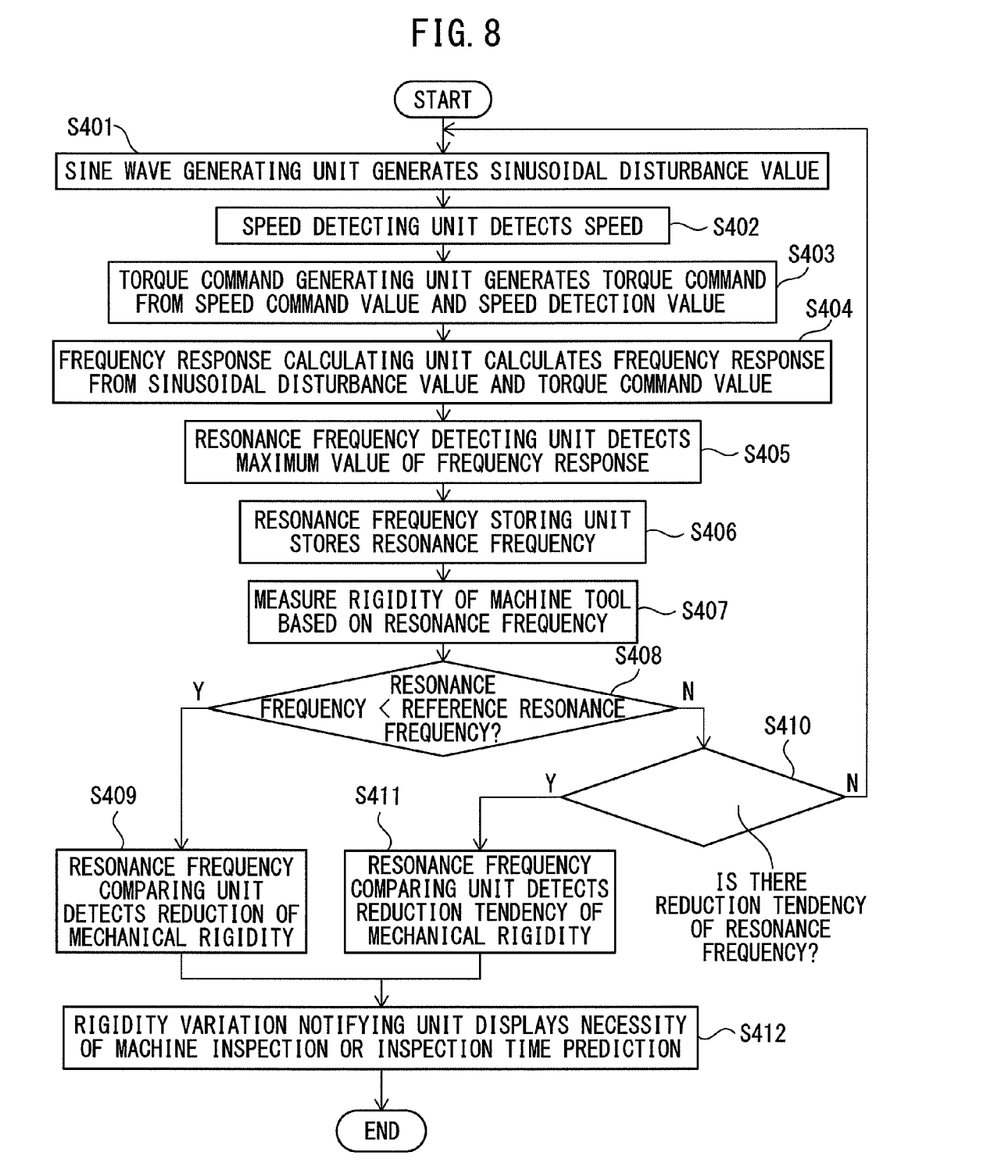
FIG. 8 is a flowchart for explaining an operation procedure of a servo motor controller according to the fourth embodiment of the present invention.

Next, an operation procedure of the servo motor controller according to the fourth embodiment of the present invention will be described with reference to the flowchart illustrated in FIG. 8. Since steps S401 to S407 in the flowchart illustrated in FIG. 8 are similar to steps S101 to S107 in the flowchart for the servo motor controller according to the first embodiment illustrated in FIG. 3, a detailed description thereof will be omitted.

In step S408, the resonance frequency comparing unit 9 determines whether the resonance frequency stored in the resonance frequency storing unit 7 is smaller than a reference resonance frequency.

When the resonance frequency comparing unit 9 determines that the resonance frequency is smaller than the reference resonance frequency, the resonance frequency comparing unit 9 detects the reduction of the mechanical stiffness in step S409.

Next, in step S412, when a stiffness variation notifying unit to be described later has been provided, the stiffness variation notifying unit displays the necessity of machine inspection.

On the other hand, when the resonance frequency comparing unit 9 determines that the resonance frequency is equal to or more than the reference resonance frequency, the resonance frequency comparing unit 9 determines whether there is a reduction tendency of the resonance frequency stored in the resonance frequency storing unit 7 in step S410. When the resonance frequency comparing unit 9 determines that there is no reduction tendency of the resonance frequency, the procedure returns to step S401 and the detection of the resonance frequency is performed again.

On the other hand, when the resonance frequency comparing unit 9 determines that there is the reduction tendency of the resonance frequency, the resonance frequency comparing unit 9 detects a reduction tendency of the mechanical stiffness.

Next, in step S412, when the stiffness variation notifying unit to be described later has been provided, the stiffness variation notifying unit displays the necessity of the machine inspection, or inspection time prediction.

As described above, in accordance with the servo motor controller according to the fourth embodiment of the present invention, the reference value of the resonance frequency is compared with an actually measured value, so that it is possible to measure a variation from the reference value and to perform inspection of a component assembly. For example, in the case of producing 10 same machine tools, a measurement result of a first machine is employed as a reference value, so that it is possible to grasp and manage a stiffness variation in a manufacturing process with respect to the other nine machines, and thus to achieve quality improvement. Moreover, a history of resonance frequencies in each measurement is preserved and a variation tendency of the resonance frequencies is monitored from the history. For example, when it is considered that automatic filter adjustment is periodically performed for one machine tool, it is possible to trace the time and the degree (Hz) for/by which mechanical resonance has been varied from the history of the resonance frequencies. In other words, it is possible to examine a tendency of stiffness reduction (to examine a speed at which the mechanical stiffness is degraded due to aging).

In other words, it is possible to detect the presence or absence of the reduction of the mechanical stiffness according to whether the resonance frequency is smaller than the reference resonance frequency, and to detect the presence or absence of the reduction tendency of the mechanical stiffness when it is determined that the mechanical stiffness has not been reduced. Consequently, even though there is no reduction of the mechanical stiffness, it is possible to cope with future reduction of the mechanical stiffness.

In the servo motor controller according to the aforementioned fourth embodiment, the example, in which it is determined whether the resonance frequency is smaller than the reference resonance frequency and then it is determined whether there is the reduction tendency of the resonance frequency, has been described; however, the present invention is not limited thereto. In other words, the presence or absence of the reduction tendency of the resonance frequency may be determined and then whether the resonance frequency is smaller than the reference resonance frequency may be determined. In this case, since it is possible to confirm that there is no reduction of the mechanical stiffness on the basis of the fact that there is no reduction tendency of the resonance frequency, it is possible to omit the step of comparing the resonance frequency with the reference resonance frequency.

Embodiment 5

Figure 9:
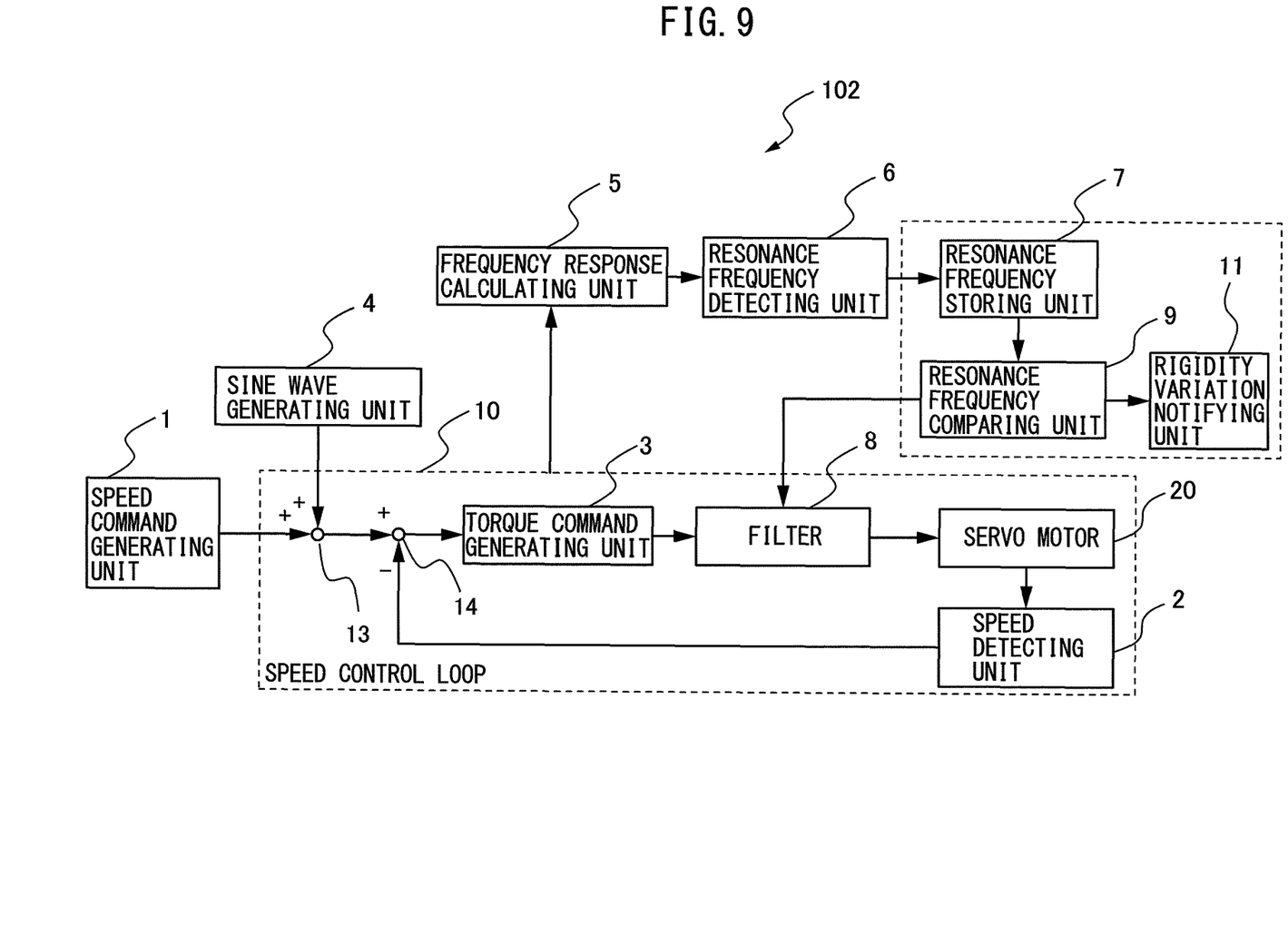
FIG. 9 is a configuration diagram of a servo motor controller according to the fifth embodiment of the present invention.

Next, a servo motor controller according to an embodiment 5 of the present invention will be described. FIG. 9 illustrates a configuration diagram of a servo motor controller according to the embodiment 5. A servo motor controller 102 according to the embodiment 5 is different from the servo motor controller 101 according to the first embodiment in that the servo motor controller 102 further includes a stiffness variation notifying unit 11 that notifies the inspection of parts or the whole of a machine tool or predicts an inspection time when the resonance frequency comparing unit 9 has detected reduction from a reference value of mechanical stiffness or a reduction tendency in a history of stiffness measurement to be preserved. Since other configurations of the servo motor controller 102 according to the embodiment 5 are similar to those of the servo motor controller 101 (see FIG. 1) according to the first embodiment, a detailed description thereof will be omitted.

In accordance with the servo motor controller according to the embodiment 5, on the basis of an individual difference or a secular change of stiffness in a non-disassembled state, the controller itself can predict the necessity of inspection for examining the degree of assembly of mechanical parts or an inspection time thereof. When there is a significant variation in stiffness at the time of manufacturing, since the necessity of inspection can be quickly determined by comparison of a measured value of a resonance frequency and the reference value, it can be utilized in quality management of a machine. When a secular change is significant, it is possible to predict an inspection time of parts in advance, resulting in the improvement of an operating ratio of the machine.

As described above, in accordance with the servo motor controllers according to the embodiments of the present invention, it is possible to measure a stiffness variation in a manufacturing process by comparison of a resonance frequency and a reference value at the time of assembling of a machine, and to further monitor a secular change of mechanical stiffness by regular measurement after machine shipment. Furthermore, stiffness measurement can be performed without disassembling a machine and self-prediction of a maintenance time is possible.

In accordance with the present invention, it is possible to provide a servo motor controller capable of providing a comprehensive inspection technology, which enables maintenance inspection prediction of a machine in non-destructive and non-disassembly as well as simple stabilization of a servo control system.

What is claimed is:

1. A controller that controls a servo motor for driving a machine tool, comprising:
   a speed command generating unit configured to generate a speed command value of the servo motor;
   a speed detecting unit configured to detect a speed of the servo motor;
   a torque command generating unit configured to generate a torque command value of the servo motor on a basis of the speed command value and the detected speed;
   a sine wave generating unit configured to generate a sinusoidal disturbance value;
   a frequency response calculating unit configured to add the sinusoidal disturbance value generated by the sine wave generating unit to the speed command value, thereby calculating a frequency response on a basis of output from a speed control loop when the sinusoidal disturbance value has been input to the speed control loop including the torque command generating unit and the speed detecting unit;
   a resonance frequency detecting unit configured to detect a resonance frequency which is a frequency at which a gain of the calculated frequency response is maximized;
   a resonance frequency storing unit configured to store the resonance frequency detected by the resonance frequency detecting unit;
   at least one filter that attenuates a specific frequency band component included in the torque command value; and
   a resonance frequency comparing unit configured to measure stiffness of a machine tool on a basis of the resonance frequency stored in the resonance frequency storing unit, and adjusts the filter with respect to the resonance frequency.

2. The servo motor controller according to claim 1,
   wherein the resonance frequency comparing unit detects a change in the stiffness of the machine by comparing the resonance frequency stored in the resonance frequency storing unit with a reference resonance frequency.

3. The servo motor controller according to claim 1,
   wherein the resonance frequency storing unit stores a history of resonance frequencies in each measurement, and
   wherein the resonance frequency comparing unit detects a reduction tendency of the stiffness of the machine by comparing the resonance frequency stored in the resonance frequency storing unit with the history of the resonance frequencies.

4. The servo motor controller according to claim 1, further comprising:
   a stiffness variation notifying unit configured to notify inspection of parts or a whole of the machine tool or predicts an inspection time when the resonance frequency comparing unit has detected reduction from a reference value of mechanical stiffness or a reduction tendency in a history of stiffness measurement.

* * * * *